Nov. 21, 1950     A. SECOFSKY ET AL     2,530,912
COMBINED FLOODLIGHT HOLDER AND CAMERA SUPPORT
Filed Dec. 31, 1947     2 Sheets-Sheet 1
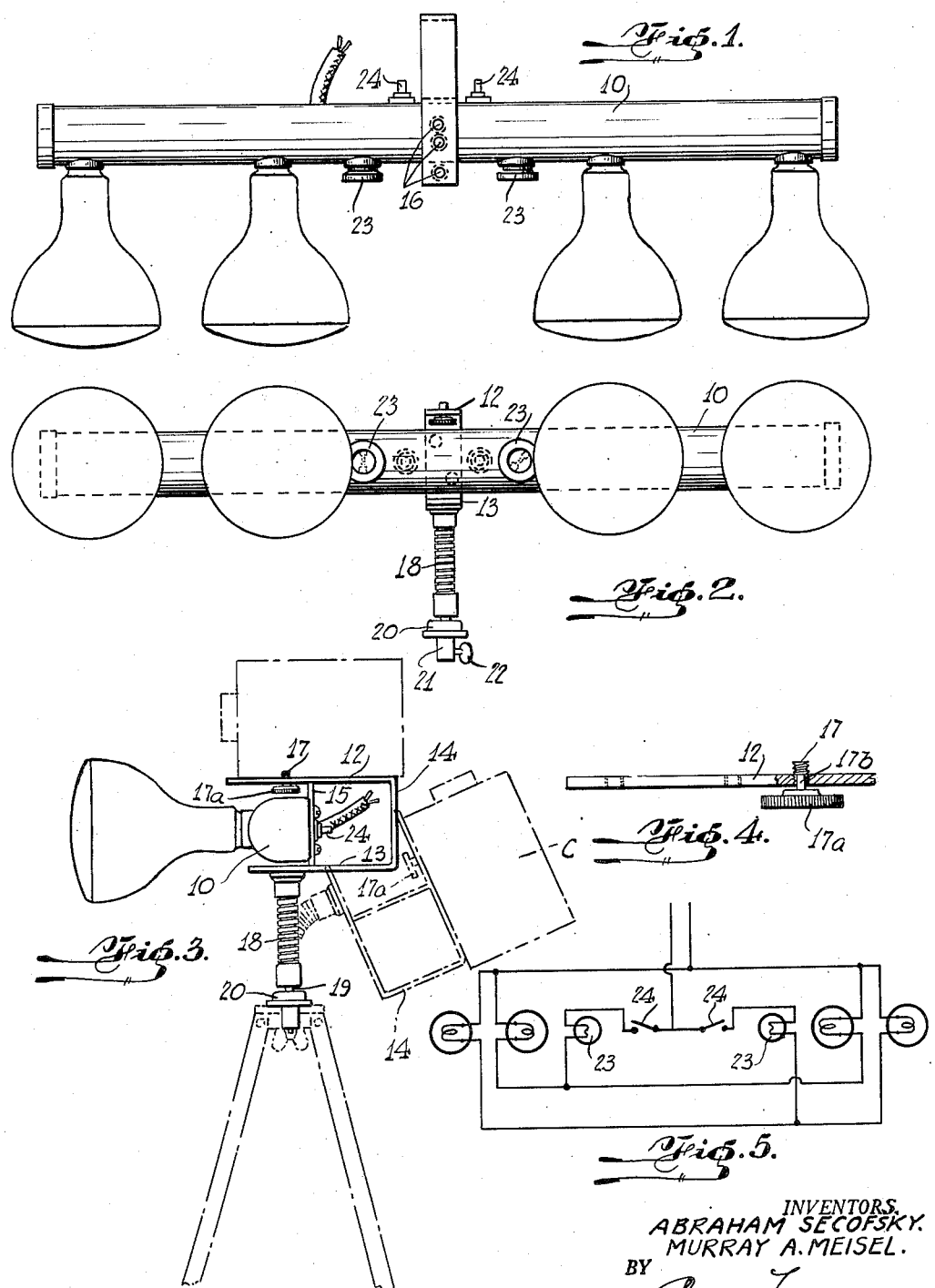
INVENTORS.
ABRAHAM SECOFSKY.
MURRAY A. MEISEL.
BY
*Percy Freeman*
ATTORNEY.

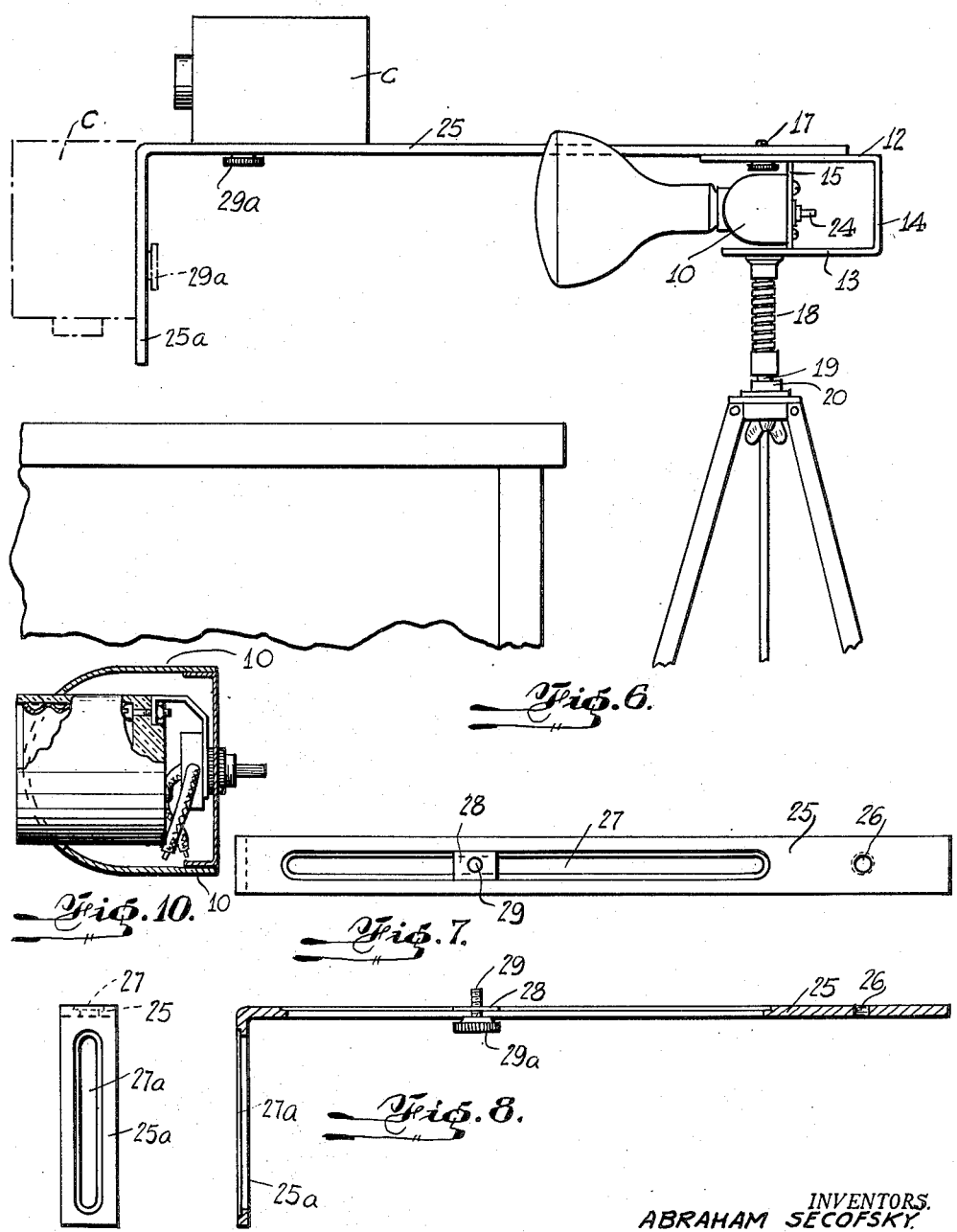

Patented Nov. 21, 1950

2,530,912

UNITED STATES PATENT OFFICE 2,530,912

COMBINED FLOODLIGHT HOLDER AND CAMERA SUPPORT

Abraham Secofsky, New York, and Murray A. Meisel, Brooklyn, N. Y.

Application December 31, 1947, Serial No. 794,862

5 Claims. (Cl. 248—160)

This invention relates to an improved combination floodlight holder and camera support and has as its general object, the provision of a floodlight holder upon which a camera may be directly mounted in order to allow adjustment of the floodlights and operation of the camera by a single operator.

Heretofore, it has been necessary for an assistant to adjust and hold the floodlights or for the photographer to preadjust the floodlights at points inconveniently removed from the camera and then properly focus the camera. Frequently, it has been necessary to readjust the floodlights before satisfactory illumination of the object is obtained, thereby entailing great inconvenience and loss of time by the photographer.

Accordingly, it is the primary object of the invention to provide a floodlight holder having a bracket upon which the camera may be mounted.

It is a further object of the invention to provide a floodlight holder upon which a camera may be directly mounted, and having a flexible, adjustable connection for mounting upon a tripod or similar support, thereby allowing angular adjustment of the floodlight holder and camera in all directions.

Another object of the invention is the provision of a floodlight holder having a bracket upon which a camera may be directly mounted, the bracket being shaped in such a manner as to provide a convenient holding element when a tripod or similar support is not available.

The foregoing objects, as well as additional objects and advantages of the invention will be readily apparent in the course of the following detailed description taken in connection with the accompanying drawings, which illustrate preferred embodiments of the invention, and wherein:

Fig. 1 is a top plan view of a floodlight holder embodying the features of the invention, showing the elongated floodlight housing and the camera mounting bracket, the floodlight bulbs being shown in dotted outline.

Fig. 2 is a front plan view of the holder of Fig. 1, showing the adjustable, flexible connection for mounting the holder on a tripod or support.

Fig. 3 is a side elevation of the holder mounted on a tripod, one of the possible adjusted positions of the holder being shown in dotted outline.

Fig. 4 is a fragmentary detail of the upper arm of the holder bracket illustrating the preferred design of the mounting screw for holding the camera.

Fig. 5 is a diagrammatic wiring diagram for the floodlight holder.

Fig. 6 is a side elevation of a modification of the floodlight holder employing an extension arm for mounting the camera closer to the object or even above the object.

Fig. 7 is a top plan view of the extension arm.

Fig. 8 is a side elevation of the extension arm.

Fig. 9 is a front elevation of the extension arm.

Fig. 10 is a sectional view of the socket housing showing a socket partly in section, to illustrate the method of mounting a socket in the housing.

Referring now to the drawings in greater detail, the floodlight holder comprises an elongated housing 10 having receptacles for retaining floodlight bulbs (shown in dotted outline) and a preferably U-shaped bracket 11 having an upper arm 12, a lower arm 13, a transverse connecting arm 14 and an auxiliary transverse support 15, substantially parallel to transverse member 14. Bracket 11 is preferably secured centrally of housing 10 by means of screws or in any other suitable manner.

Upper arm 12 of bracket 11 may have threaded mounting holes 16 within which may be selectively threaded a mounting screw 17. In order to facilitate the attachment of a camera upon upper arm 12, mounting screw 17 is preferably not threaded completely down to enlarged screw head 17a, but is provided with a reduced unthreaded neck portion 17b allowing said screw to rotate freely once it is threaded into upper member 12 beyond the threaded portion thereof.

Lower arm 13 has secured adjacent its free end a flexible, adjustable connection or cable 18 preferably terminating in a threaded plug 19 for securing the floodlight holder within a conventional threaded socket of a tripod or similar support. In order to accommodate the floodlight holder for improvised supports not having a threaded socket, an adapter 20 may be provided for threaded engagement with plug 19 of flexible connection 18. As clearly shown in Fig. 2, adapter 20 may have a collar 21 and thumbscrew 22 for securing said adapter to any support presenting a projecting plug or rod.

The holder may be mounted on a tripod by threading plug 19 into the tripod socket and the camera may be mounted on upper arm 12 of bracket 11 by means of mounting screw 17, as shown in Fig. 3. The floodlight holder and camera may then be tiltably adjusted in any desired direction by the operator by bending the flexible, adjustable connection 18.

While the drawings illustrate the floodlight holder having a capacity of six floodlight bulbs arranged in banks of three on either side of the centrally disposed bracket 11, the number and arrangement of the floodlight bulbs may be varied. In the illustrated embodiment, the innermost pair of receptacles is shown having fuses 23 inserted therewithin to eliminate excessive glare in the immediate vicinity of the camera lens as might result from bulbs being placed within these receptacles. If a particular situation requires separate use of the holder without the camera being directly mounted thereon, the fuses 23 may be replaced by floodlight bulbs.

When a tripod or support is not available, the floodlight holder and attached camera may be conveniently supported by hand, using transverse arm 14 of bracket 11.

Each bank of floodlights may be controlled by a separate switch 24, as clearly shown in Fig. 5, or, if desired, a suitable alternative wiring arrangement may be employed.

Figs. 6–9, inclusive, illustrate a modification of the holder employing an extension arm 25, upon which the camera C may be mounted in order to introduce greater flexibility of use to the holder than when the camera is directly on upper arm 12 of bracket 11. Extension arm 25 is preferably elongated and has a threaded mounting hole 26 adjacent one end for the reception of mounting screw 17 retained by upper arm 12 of bracket 11. A beveled groove or slot 27 is formed in extension arm 25 for slidably retaining a plate 28 having a fastening screw 29 provided with an enlarged head 29a, said fastening screw serving to secure the camera at any desired point along groove or slot 27. Extension arm 25 may further be L-shaped, having a shorter depending portion 25a carrying a corresponding groove or slot 27a so that the camera C may be adjustably positioned vertically along depending portion 25a by means of plate 28 and fastening screw 29, as shown in dotted outline at the left of Fig. 6.

Since certain modifications may be made in the combination floodlight holder and camera support of the invention without departing from the scope thereof, it is intended that all matter contained in the foregoing description and shown in the accompanying drawing be interpreted merely as illustrative and not in a limiting sense.

Having thus described our invention, what we claim as new and desire to secure by Letters Patent, is:

1. As an article of manufacture for use with an elongated housing carrying a plurality of spaced floodlight receptacles, a camera and a camera support; said article comprising a U-shaped bracket defined by an upper arm, a lower arm and a transverse arm, an auxiliary arm spaced from said transverse arm and fixed between said upper and lower arms, said housing being secured to said auxiliary arm, a mounting screw carried by the upper arm of said bracket for mounting a camera thereupon and a connection fixed to the lower arm of said bracket for securing said bracket to a tripod, support or the like.

2. A combination floodlight holder and camera support comprising an elongated housing carrying a plurality of spaced floodlight receptacles, a U-shaped bracket fixed to said housing centrally thereof, a mounting screw carried by the upper arm of said bracket, a flexible, adjustable connection fixed to the lower arm of said bracket for securing said bracket to a tripod, support or the like and an extension arm securable to the upper arm of said bracket by means of said mounting screw, said extension arm having a beveled slot, a slidable plate carried by said slot and a removable fastening screw carried by said plate for adjustably positioning a camera along said extension arm.

3. A device in accordance with claim 2, said extension arm having a depending portion at one end thereof, said depending portion having a beveled slot, whereby to adjustably position a camera along said depending portion by means of said plate and said fastening screw.

4. As an article of manufacture for use with an elongated housing carrying a plurality of spaced floodlight receptacles, a camera and a camera support; said article comprising a U-shaped bracket defined by an upper arm, a lower arm and a transverse arm, an auxiliary arm spaced from said transverse arm and fixed between said upper and lower arms, said housing being secured to said auxiliary arm, a mounting screw carried by the upper arm of said bracket, a connection fixed to the lower arm of said bracket for securing said bracket to a tripod, support or the like, and an extension arm securable to the upper arm of said bracket by means of said mounting screw, said extension arm having a beveled slot, a slidable plate carried by said slot and a removable fastening screw carried by said plate for adjustably positioning a camera along said extension arm.

5. A device in accordance with claim 4, said extension arm having a depending portion at one end thereof, said depending portion having a beveled slot, whereby to adjustably position a camera along said depending portion by means of said plate and said fastening screw.

ABRAHAM SECOFSKY.
MURRAY A. MEISEL.

REFERENCES CITED

The following references are of record in the file of this patent:

UNITED STATES PATENTS

| Number | Name | Date |
| --- | --- | --- |
| 1,780,225 | De Moulin | Nov. 4, 1930 |
| 2,111,368 | Kron | Mar. 15, 1938 |
| 2,237,281 | Diesbach | Apr. 1, 1941 |
| 2,239,379 | Bucky | Apr. 22, 1941 |
| 2,318,633 | Ries | May 11, 1943 |
| 2,403,892 | McFarlane | July 9, 1946 |